United States Patent
Bataller et al.

(10) Patent No.: US 9,805,306 B1
(45) Date of Patent: Oct. 31, 2017

(54) COGNITIVE ROBOTICS ANALYZER

(71) Applicant: Accenture Global Solutions Limited, Dublin (IE)

(72) Inventors: Cyrille Bataller, Mougins (FR); Vitalie Schiopu, Bertrange (LU); Adrien Jacquot, Antibes Juan-les-Pins (FR); Sergio Raúl Duarte Torres, The Hague (NL); Simon Hall, Noord-Holland (NL)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/360,535

(22) Filed: Nov. 23, 2016

(51) Int. Cl.
*G06N 5/02* (2006.01)
*H04L 29/08* (2006.01)
*H04L 12/26* (2006.01)
*G06N 99/00* (2010.01)

(52) U.S. Cl.
CPC .......... *G06N 5/022* (2013.01); *G06N 99/005* (2013.01); *H04L 43/14* (2013.01); *H04L 67/22* (2013.01); *H04L 67/306* (2013.01)

(58) Field of Classification Search
CPC ........ G06N 5/022; G06N 99/005; G06N 3/02; H04L 43/14; H04L 67/22; H04L 67/306
USPC .......................................................... 706/21
See application file for complete search history.

(56) References Cited

U.S. PATENT DOCUMENTS

| | | | |
|---|---|---|---|
| 4,825,394 A | 4/1989 | Beamish et al. | |
| 7,565,607 B2 | 7/2009 | McGlinchey et al. | |
| 8,095,237 B2 | 1/2012 | Habibi et al. | |
| 8,330,811 B2 | 12/2012 | Macguire, Jr. | |
| 8,330,812 B2 | 12/2012 | Maguire, Jr. | |
| 8,559,699 B2 | 10/2013 | Boca | |
| 8,793,578 B2 | 7/2014 | Mounty et al. | |
| RE45,062 E | 8/2014 | Maguire, Jr. | |
| RE45,114 E | 9/2014 | Maguire, Jr. | |
| 2001/0044661 A1 | 11/2001 | Kaji et al. | |
| 2004/0189675 A1 | 9/2004 | Pretlove et al. | |
| 2004/0250214 A1* | 12/2004 | McGlinchey ......... | G06F 9/4446 715/762 |
| 2005/0069207 A1 | 3/2005 | Zakrzewski et al. | |

(Continued)

OTHER PUBLICATIONS

Yeh T. et al., "Sikuli: Using GUI Screenshots for Search and Automation", UIST'09, Oct. 4-7, 2009, Victoria, British Columbia, Canada.*

*Primary Examiner* — Dave Misir
(74) *Attorney, Agent, or Firm* — Fish & Richardson P.C.

(57) ABSTRACT

Methods, systems, and apparatus, including computer programs encoded on a computer storage medium, for a cognitive robotics analyzer are disclosed. In one aspect, a method includes the actions of receiving, for each user characteristic of a plurality of user characteristics, first data that identifies one or more first actions that perform a first process and second data that identifies one or more second actions that perform a second process that is labeled as similar to the first process. The actions further include training a predictive model. The actions further include receiving data that identifies actions performed by a user. The actions further include applying the predictive model to one or more of the actions. The actions further include classifying a process performed by the one or more actions as similar to a particular process. The actions further include associating the user with the particular user characteristic.

20 Claims, 7 Drawing Sheets

(56) References Cited

U.S. PATENT DOCUMENTS

| | | |
|---|---|---|
| 2006/0119572 A1 | 6/2006 | Lanier |
| 2007/0127101 A1 | 6/2007 | Oldroyd et al. |
| 2009/0037024 A1 | 2/2009 | Jamieson et al. |
| 2010/0222957 A1 | 9/2010 | Ohta et al. |
| 2011/0015649 A1 | 1/2011 | Anvari et al. |
| 2011/0276396 A1* | 11/2011 | Rathod ............ G06F 17/30867 705/14.49 |
| 2012/0095619 A1 | 4/2012 | Pack et al. |
| 2012/0197439 A1 | 8/2012 | Wang et al. |
| 2013/0019170 A1* | 1/2013 | Mounty .............. G06F 11/3688 715/704 |
| 2013/0078600 A1 | 3/2013 | Fischer et al. |
| 2013/0178980 A1 | 7/2013 | Chemouny et al. |
| 2013/0262349 A1* | 10/2013 | Bouqata ............... G06N 99/005 706/12 |
| 2013/0335405 A1 | 12/2013 | Scavezze et al. |
| 2013/0345875 A1 | 12/2013 | Brooks et al. |
| 2014/0129942 A1* | 5/2014 | Rathod ............ H04N 21/44222 715/720 |
| 2014/0222023 A1 | 8/2014 | Kim et al. |
| 2014/0369558 A1 | 12/2014 | Holz |
| 2014/0376777 A1 | 12/2014 | Churchill et al. |
| 2015/0096876 A1 | 4/2015 | Mittleman et al. |
| 2015/0287310 A1 | 10/2015 | DeIiuliis et al. |
| 2016/0167226 A1 | 6/2016 | Schnittman et al. |
| 2017/0004408 A1* | 1/2017 | Edelen .................... G06N 5/02 |
| 2017/0034035 A1* | 2/2017 | Coleman ................ H04L 43/12 |

\* cited by examiner

COGNITIVE ROBOTICS ANALYZER

TECHNICAL FIELD

This application generally relates to machine learning.

BACKGROUND

Manual processes performed on a computer may be repetitive and time consuming. For example, a user may send e-mails in response to web form submissions, and for each web form submission, may need to manually interact with a computer to click buttons to open a window for composing a new e-mail, click buttons to copy information from the web form submission into the window, click keys to write text for a body of the e-mail, and click buttons to send the e-mail.

SUMMARY

Grouping users according to different characteristics has traditionally relied upon characteristics provided by the users themselves or on characteristics provided by another party such as an employer. To group a user according to a characteristic, a system analyzes user actions from training data and generates a predictive model using machine learning, data clustering, and deep learning. The predictive model is configured to identify processes that the user performs and to correlate the processes with other processes that correspond to known characteristics. In other words, the predictive model first identifies the process that a user performs. The predictive model then identifies characteristics of the user based on the actions of the process. The action may not be enough for the predictive model to identify a characteristic. For example, a user located in the United Kingdom may be more likely to visit a website that includes the spelling "colour" in the text of the website. In this instance, visiting the website is the process and viewing the text "colour" is the action. It may not be as likely that a user reading an email with the spelling "colour" is located in the United Kingdom because the user may be in the United States and reading an email sent from a user in the United Kingdom. In this instance, reading the email is the process and viewing the text "colour" is the action. Therefore, the system uses the predictive model to identify processes and then assign characteristics to users based on the actions of similar processes.

The system may also use predictive models to identify variables in a group of user actions where each group of actions performs the same process. The system receives training data that identifies actions that each perform at least one process. Using that training data the system generates predictive models that are configured to identify processes based on receiving the actions that a user performs. The user may click a mouse, swipe the screen, type a keypad, and view images and text, and the predictive model is able to identify actions such as entering an invoice based on those actions. The system compares the actions to other groups of actions for the same process and identifies actions that may vary across the groups of actions. The system also identifies actions that may be noise, or unnecessary actions, that are not part of the overall process. By identifying the noise and the variables, the system may more efficiently automate a process.

An innovative aspect of the subject matter described in this specification may be implemented in a method that includes the actions of receiving, for each user characteristic of a plurality of user characteristics, first data that identifies one or more first actions that perform a first process and second data that identifies one or more second actions that perform a second process that is labeled as similar to the first process; training, using the first data for each user characteristic and using the second data for each user characteristic, a predictive model that is configured to classify actions as similar or not similar to the first process and the second process; receiving data that identifies actions performed by a user; applying the predictive model to one or more of the actions; based on applying the predictive model to the one or more of the actions, classifying a process performed by the one or more actions as similar to a particular process that is associated with a particular user characteristic; and associating the user with the particular user characteristic.

These and other implementations can each optionally include one or more of the following features. The actions further include receiving data confirming that the user is associated with the user characteristic; and updating the predictive model based on the data confirming that the user is associated with the user characteristic. The actions further include receiving data confirming that the user is not associated with the user characteristic; and updating the predictive model based on the data confirming that the user is not associated with the user characteristic. The action of receiving, for each user characteristic of a plurality of user characteristics, first data that identifies one or more first actions that perform a first process and second data that identifies one or more second actions that perform a second process that is labeled as similar to the first process includes receiving first screen capture data from a device performing the one or more first actions; receiving second screen capture data from a device performing the one or more second actions; generating the first data by performing computer vision techniques on the first screen capture data; and generating the second data by performing computer vision techniques on the second screen capture data.

The action of receiving, for each user characteristic of a plurality of user characteristics, first data that identifies one or more first actions that perform a first process and second data that identifies one or more second actions that perform a second process that is labeled as similar to the first process includes receiving first user input data from a device performing the one or more first actions; receiving second user input data from a device performing the one or more second actions; generating the first data by analyzing the first user input data; and generating the second data by analyzing the second user input data. The action of receiving, for each user characteristic of a plurality of user characteristics, first data that identifies one or more first actions that perform a first process and second data that identifies one or more second actions that perform a second process that is labeled as similar to the first process includes receiving first network traffic data from a device performing the one or more first actions; receiving second network traffic data from a device performing the one or more second actions; generating the first data by analyzing the first network traffic data; and generating the second data by analyzing the second network traffic data. The first process is similar to the second process if the first process and the second process use a same hardware or a same software. A user characteristic identifies a company, a geographic location, an operational unit, an operational role, or an expertise level. An action includes a key press, a mouse click, a screen touch, a foreground process change, a scene change, a network request, or a network receipt. A process includes viewing a website, receiving a type of email attachment, entering a type of data, performing a web search or using a type of software.

Other implementations of this aspect include corresponding systems, apparatus, and computer programs recorded on computer storage devices, each configured to perform the operations of the methods.

Another innovative aspect of the subject matter described in this specification may be implemented in a method that includes the actions of receiving data that identifies groups of one or more actions that are labeled as performing a same process; identifying, in each group of one or more actions, a particular action that is associated with variable information; training, using the data that identifies the groups of the one or more actions that are labeled as performing the same process and using the particular actions that are associated with variable information, a predictive model that is configured to (i) classify a group of one or more actions as performing the same process or not performing the same process and (ii) identify an action of the group of the one or more actions that is associated with variable information; receiving data that identifies a given group of actions; applying the predictive model to the given group of actions; based on applying the predictive model to the given group of actions, classifying the given group of actions as performing the same process and identifying a given action of the given group of actions that is associated with variable information; and outputting data classifying the given group of actions as performing the same process and data identifying the given action and the variable information.

These and other implementations can each optionally include one or more of the following features. The actions further include receiving data confirming that the given group of actions perform the same process; and updating the predictive model based on the data confirming that the given group of actions performs the same process. The actions further include receiving data confirming that the given group of actions do not perform the same process; and updating the predictive model based on the data confirming that the given group of actions do not perform the same process. The action of receiving data that identifies groups of one or more actions that are labeled as performing a same process includes receiving screen capture data from a device performing one of the groups of the one or more actions; and generating the data by performing computer vision techniques on the screen capture data.

The action of receiving data that identifies groups of one or more actions that are labeled as performing a same process includes receiving user input data from a device performing one of the groups of the one or more actions; and generating the data by analyzing the user input data. The action of receiving data that identifies groups of one or more actions that are labeled as performing a same process includes receiving network traffic data from a device performing one of the groups of the one or more actions; and generating the data by analyzing the network traffic data. An action includes a key press, a mouse click, a screen touch, a foreground process change, a scene change, a network request, or a network receipt. The actions further include based on applying the predictive model to the given group of actions, identifying an additional action of the given group of actions that is associated with noise action. The actions further include determining a type of variable corresponding to the given action. The method of claim 11, wherein the data identifying the given action and the variable information includes a name for the variable information based on the given action.

Other implementations of this aspect include corresponding systems, apparatus, and computer programs recorded on computer storage devices, each configured to perform the operations of the methods.

Particular implementations of the subject matter described in this specification can be implemented so as to realize one or more of the following advantages. A system may improve security by assigning users to groups based on characteristics that are based on actions that they actually perform. Each group can be tied to various security permissions. The system may also identify inefficiencies in a process by identifying actions that may be unnecessary to completely the process.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
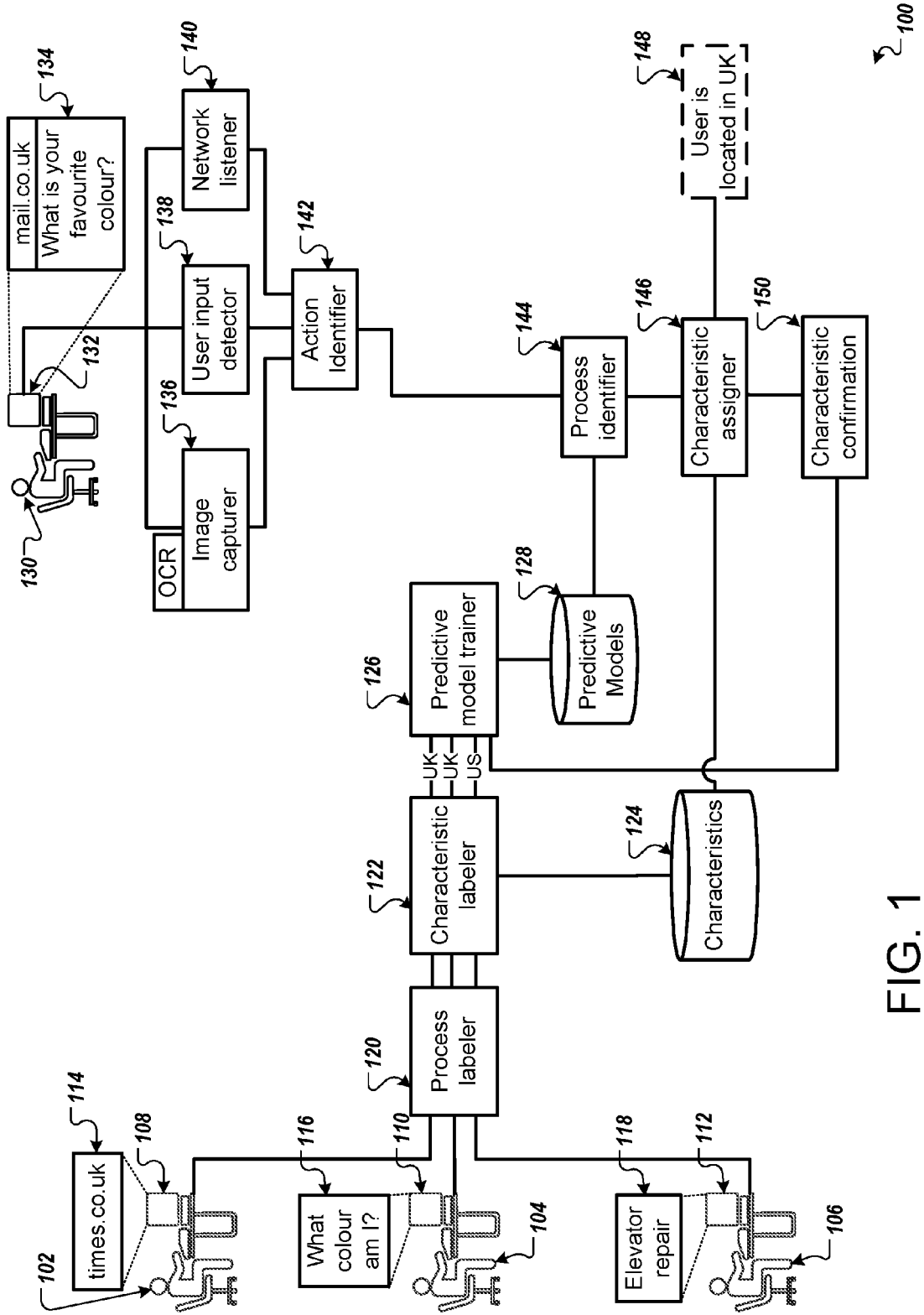
FIGS. 1-3 illustrate example systems for cognitive robotic analyzers.

FIG. 1 illustrates an example system 100 for a cognitive robotic analyzer. Briefly, and as described in more detail below, the system 100 receives training data based on users' previous interactions with computing devices. The training data identifies the process that a user's interactions perform as well as a characteristic of the user. The system 100 generates a predictive model to assign characteristics to other users by analyzing the other users' interactions with computing devices. The system 100 may group the users according to the assigned characteristics.

In the example shown in FIG. 1, the system 100 receives training data that originates from users 102, 104, and 106. User 102 interacts with computing device 108 by visiting the website times.co.uk. User 104 interacts with computing device 110 and fills out a quiz related to "What colour am I?" User 106 interacts with computing device 112 and enters the search query "elevator repair." Each of the computing devices 108, 110, and 112 may be devices that are configured to communicate over a network such as mobile phones, tablets, laptop computers, desktop computers, watches, or any other device that is configured to receive input through a touch screen, keyboard, microphone, pointing device, antenna, camera, or similar device. Each of the computing devices 108, 110, and 112 is also configured to output data to a screen, speakers, or tactile feedback device.

To generate training data from the user data 114, the system 100 is configured to monitor and collect input and output data. The system 100 may collect screen capture data that may include data related to the user visiting the website times.co.uk. The system 100 may perform image recognition and optical character recognition on the data 114. The data 114 may include screen capture data that illustrates a browser visiting the times.co.uk website where the address bar includes a times.co.uk web address. The system 100 may also monitor network traffic that is transmitted and received from the computing device 108. The network traffic may include data packets sent from the times.co.uk server to the computing device 108 as well as data packet sent from the computing device 108 to the times.co.uk server. The data 114 may also include user input received by the computing device 108. The user input may include keyboard presses, mouse location and clicks, touch data, audio data received through a microphone, or visual data received through a camera. The system 100 may capture the data 114 at predetermined intervals such as capture the screen data every second or when the user inputs data such as when the user clicks the mouse.

The system 100 may also generate training data from data 116 and data 118. The data 116 and 118 may include screen capture data, network traffic data, and user input data. For example, the data 116 may include screen capture data that includes the user 104 entering data into the "What colour am I?" quiz. The data 118 may include network traffic data related to the user 106 entering the search query "elevator repair." The data 114, 116, and 118 may each also include process data. Process data relates to the processes that are currently executing on the corresponding computing device. For example, in addition to various operating system processes and basic computing processes, the computing device 108 may be executing a browser process. The process data may also include the amount, or percentage, of processing power each process utilizes. The process data may also include the amount of memory allocated to the process.

In some implementations, the data 114, 116, and 118 may also include data related to the user, the user's employment, the user's location, or other similar type of data. For example, the data 114 may include data that indicates that the user's 102 location is in the United Kingdom. The data 116 may also include data that indicates that the user's 104 location is in the United Kingdom. The data 118 may include data that indicates that the user's 106 location is in the United States. Additionally, the data 114 may include data that describes the user 102 as an accountant who works in the finance department. The data 114 may also indicate that the user 102 is a novice or junior accountant. Similarly, data 118 may include data that describes the user 106 as a contract officer in the procurement department. The data 118 may also indicate that the user 106 is an expert or senior contract officer. In some implementations, this data is entered by the user. For example, the user 105 may enter employment related data when the user authorizes the system 100 to collect data. In some implementations, the system 100 retrieves the data from a data store such as a human resources databases that is maintained by a company.

The system 100 receives the data 114, 116, and 118 and then generates the training data using the data 114, 116, and 118. To generate the training data the system 100 provides the data 114, 116, and 118 to a process labeler 120. The process labeler 120 labels the actions being performed by each the users 102, 104, and 106 as performing a particular process. The process labeler 120 may label the data 114 that includes the actions performed by the user 102 as well as other computing device 108 data as performing a process of browsing web content, reading news, or internet activity. The process labeler 120 may apply a certain number of process labels to each group of actions. For example, the process labeler 120 may apply one, three, or five labels to each group of actions. The process labeler 120 may also apply a varying number of process labels to each group of actions depending on which labels are applicable to the groups of actions.

The process labeler 120 may label the actions and data of computing device 110 as performing a process of completing an online quiz or internet activity. The process labeler 120 may label the actions and data of computing device 112 as performing a process of entering a search query. The process labeler 120 may label groups of actions according to a predefined set of rules. For example, if actions include providing data to a search engine, then the process labeler 120 labels the actions as entering a search query and browsing web content. The labeling may also be performed by individuals who review the actions and apply a label based on the individual's judgment. For example, the labels may be selected by the users 102, 104, and 106. In this case, the users may agree to provide the data 114, 116, and 118 and then also select one or more labels for the data. The labels may be predefined such that the process labeler 120 may only select from particular labels. The process labeler 120 may also apply any label to the actions.

In some implementations, the system 100 and other systems described below may include a grouping module. The grouping module may automatically group series of actions that are similar to each other. The grouping module may also apply a label that identifies the series of actions. In some implementations, an individual may review the label that identifies the serious of actions to confirm the label is accurate. In some implementations, the individual may apply a label instead of the grouping module applying a label. The series of actions may be actions that are consecutively performed by a user or almost consecutively by the user. The series of actions may also be actions that are performed by multiple users. In some implementations, the grouping module may user cluster analysis such as hierarchical clustering, centroid based clustering, distribution based clustering, or density based clustering to identify the similar actions. Other components of the system 100 and the other systems described below may use the data generated by the grouping module to perform the corresponding function of the component.

Once the process labeler 120 labels each of the data 114, 116, and 118, the system 100 provides the data to the characteristic labeler 122. The characteristic labeler 122 applies one or more particular characteristics to each of the data 114, 116, and 118. In some implementations, the characteristics are selected from a characteristics data store 124. In some implementations the characteristic labeler 122 identifies characteristics and stores them in the characteristics data store 124. In the example shown in FIG. 1, the characteristics identified from data 114 and 116 are that the users 102 and 104 are located in the United Kingdom. The characteristic identified from data 118 is that the user 106 is located in the United States. The characteristic labeler 122 may then store those labels in the characteristics data store 124 for use by the system 100.

The characteristic labeler 122 may assign more than one characteristic to each group of actions that corresponds to a process. For example, the characteristic labeler 122 may apply the labels United Kingdom and junior accountant to the data 114. The characteristic labeler 122 may extract characteristic labels directly from the data 114, 116, and 118. The characteristic labeler 122 may identify labels that are included in the data 114, 116, or 118 and correspond to labels in the characteristic data store 124, such as United Kingdom and United States. In some implementations, the characteristics assigned by the characteristic labeler 122 may be done by individuals who are generating training data for the predictive model trainer 126. In some implementations, the characteristics assigned by the characteristic labeler 122 are checked and verified by individuals. In some implementations, the characteristic labeler 122 uses clustering techniques and contextual intelligence to apply characteristic labels. In some implementations, the characteristic labeler 122 is configured to include self-learning components. For example, the characteristic labeler 122 may use machine learning to adjust the labeling process to more accurately apply characteristic labels for future groups of actions. The characteristic labeler 122 may analyze training data that includes actions pre-labeled with characteristics. After the process illustrated in system 100 is complete, the labeled actions and processes may be provided to the characteristic labeler 122 to tune and adjust the characteristic labeling functions of the characteristic labeler 122. In some implementations, other components that are of the system 100 and other systems described below and that identify and apply characteristic labels may include similar machine learning aspects. The machine leaning aspects may be similar to the other machine learning aspects described throughout this application.

The system 100 provides the data that has been labeled with different process labels and characteristic labels to the predictive model trainer 126. The predictive model trainer 126 generates predictive models that are designed to apply labels to actions that a user performs with a computing device. The predictive model trainer 126 generates and stores the predictive models in the predictive model data store 128. The predictive model trainer 126 generates the predictive models using neural networks. In an example, the predictive model trainer 126 may generate a model that identifies a user as being in the United Kingdom if the user uses the spelling colour instead of color. However, the predictive model trainer 126 may also train the model to take into consideration many factors such as other spellings the user chooses, the web sites that the user visits, the input actions performed by the user. One factor may not be enough to assign a label. In some implementations, the predictive model trainer 126 may generate a model for each characteristic. For example, there may be a model to identify the location of the user, the employment position of the user, the department that employs the user, etc.

With the predictive models stored in the predictive model data store 128, the system 100 is ready to identify actions, processes, and characteristics of various users. In the example shown in FIG. 1, the user 130 interacts with computing device 132. The user 130 access email using the website mail.co.uk. In the email, the user 130 writes, "What is your favourite colour?" The computing device 132 communicates, over a network, with different components of the system 100 that are configured to detect different actions performed by the user 130. The components include an image capturer 136 that is configured to capture images of the screen of the computing device 132. The components also include a user input detector 138 that is configured to detect different types of user input. The components also include a network listener 140 that is configured to monitor network data received and transmitted from the computing device 132. In some implementations, the components include a device that is configured to query the computing device 132 to retrieve the processes being executed by the computing device 132 including the process that is running in the foreground.

The image capturer 136 is configured to capture the data shown in the display of the device 132 at periodic intervals. For example, the image capturer 136 may capture a screen shots every five seconds. The image capturer 136 may also capture the screen as directed by the user input detector 138. For example, the image capturer 136 may capture the screen when the user clicks the mouse or touches the screen. In addition to capturing screen shots, the image capturer 136 also performs optical character recognition on the screen shots. The image capturer 136 may identify the web address of mail.co.uk in the address bar and the text "What is your favourite colour?" on the screen. The image capturer 136 may also perform image recognition. For example, the image capturer 136 may be able to identify pictures of celebrities, historical figures, splash screens of popular types of software, etc.

The user input detector 138 is configured to detect user input and output through various types of user input devices such as a mouse click, keyboard press, screen touch, print job, camera capture, microphone input, speaker output, etc. In the example shown in FIG. 1, the user input detector 138 detects that the user typed the keys w-h-a-t-space-i-s-space-y-o-o-backspace-u-r in addition to other key presses. The user input detector 138 may also detect that the user clicked on the mouse when the pointer was located at pixel 248× 586.

The network listener 140 is configured to detect network data packet traffic that is transmitted and received by the computing device 132. The network listener 140 may receive data packets related to a request for data from the mail.co.uk server. The mail.co.uk server may return data packets to the computing device 132. A process detector that is configured to receive data that is related to the processes running on the computing device 132 may receive data indicating that a browser is running in the foreground. The process detector may receive data indicating that other processes are running in the background such as a spreadsheet program and a pdf viewer. The process detector may receive data at the point when the user switches the pdf program to the foreground and then returns the browser to the foreground.

The system 100 provides the data related to activity 134 performed by the user 130 on computing device 132 to the action identifier 142. The action identifier is configured to identify actions performed by the user based on the data received from the image capturer 136, the user input detector 138, the network listener 140, and possibly the process detector. The action identifier 142 compares the data received from the components and the timing data of each piece of data to determine the actions performed. For example, the action identifier 142 receives data indicating that the user clicked on the mouse when the pointer was located at pixel 248×586 at a particular time. The action identifier 142 examines the screen capture data to determine that that pixel is located in the text of "send." The action identifier may also examine the network data to determine that the network traffic indicates that the computing device 132 sent data related to the selection of a particular user selectable button which may only be identified by an encoding that the action identifier 142 may not be familiar with. Based on this data, the action identifier 142 may determine that the user selected a "send" button with the mouse.

The action identifier 142 may be configurable to detect actions at varying levels of granularity. For example, the action identifier 142 may be configured not identify each letter keystroke as an action. Instead the action identifier 142 may identify when the user enters whole words such as "your" or "favourite" by keying off the space bar, enter, or other punctuation keys. The action identifier 142 may also be configured to identify each keystroke as an action such that y-o-u-r would be four keystroke actions.

The action identifier 142 provides data identifying consecutive actions performed by the user 130 to the process identifier 144. The actions identified by the action identifier 142 may include opening a browser, enter a web address, selecting compose, "write what is your favourite colour," entering user@mail.co.uk, and selecting send. The process identifier 144 is configured to access the predictive models 128 to identify the processes that the user 130 is performing with the actions identified by the action identifier 142. The process identifier 144 selects the most likely process that corresponds to the actions. The process identifier 144 may generate a likelihood score that indicates the chance of a particular process corresponding to the actions. The process identifier 144 may calculate a score of 0.86 of the user composing an email. The other scores may be 0.61 for the user chatting with other users and 0.58 for the user entering a comment on a social media website. In this case, the process identifier 144 determines that the user 130 is likely composing an email. In some implementations, the process identifier 144 may compare data from different computing devices and compare the actions performed. For example, the process identifier 144 may receive data from a computing device while a user is entering text. At about the same time, similar text appears on a screen of another computing device. The process identifier 144 may link actions of the two computing devices together and determine that both users are chatting with each other. In some implementations, the process identifier 144 may identifier more than one process that corresponds to the actions based on the corresponding scores satisfy a threshold. For example, the process identifier 144 may identify the processes that have a score greater than a threshold of 0.8 such as composing an email and browsing the internet.

Once the process identifier 144 identifies that the process that corresponds to the actions, the process identifier 144 provides data identifying the actions and the corresponding processes to the characteristic assigner 146. The characteristic assigner 146 access the characteristics data store 124 and, in some implementations, the predictive models 128. The characteristic assigner 146 may identify different characteristics based on the actions that the user performed while considering the process performed. For example, if the user 130 is composing an email and uses the spelling "colour" and "favourite," then it is likely that the user 130 has characteristic 148, which is being located in the United Kingdom. The characteristic assigner 146 may also assign a characteristic such as the user working in the human resources department based on the user performing the process of receiving an email and viewing a document with "experience" and "education" in the text. The characteristic assigner 146 may calculate a score for each of the characteristics in the characteristic data store 124. The characteristic assigner 146 may assign the characteristic with the score that surpasses the other characteristic scores. Alternatively, the characteristic assigner 146 may assign the characteristics with a score satisfies a threshold.

In some implementations, the system 100 may provide feedback to the predictive model trainer 126. The feedback may increase the accuracy of the predictive models 128 by providing additional data to the predictive model trainer 126. The characteristic confirmation 150 may receive feedback from a user such as user 130 who confirms or rejects the characteristics assigned to the user. The characteristic confirmation or rejection 150 may not necessarily be received from the user 130 who the characteristic was assigned to. For example, an additional user may review assigned characteristics.

In some implementations, assigning users to characteristics may improve the security of systems that the users have access to. A user may have accesses and permissions that are assigned based on the user's employment position in a company. Based on the processes performed by users who are in a similar position, the system 100 may identify processes that a junior group in that position perform and processes that a senior group in that position perform. The processes performed by the senior group may include some additional processes. Instead of providing, to the junior users, access to all of those processes performed by the senior users, the company may improve security by reducing the processes that the position has access to based on the seniority characteristic of the user.

Figure 2:
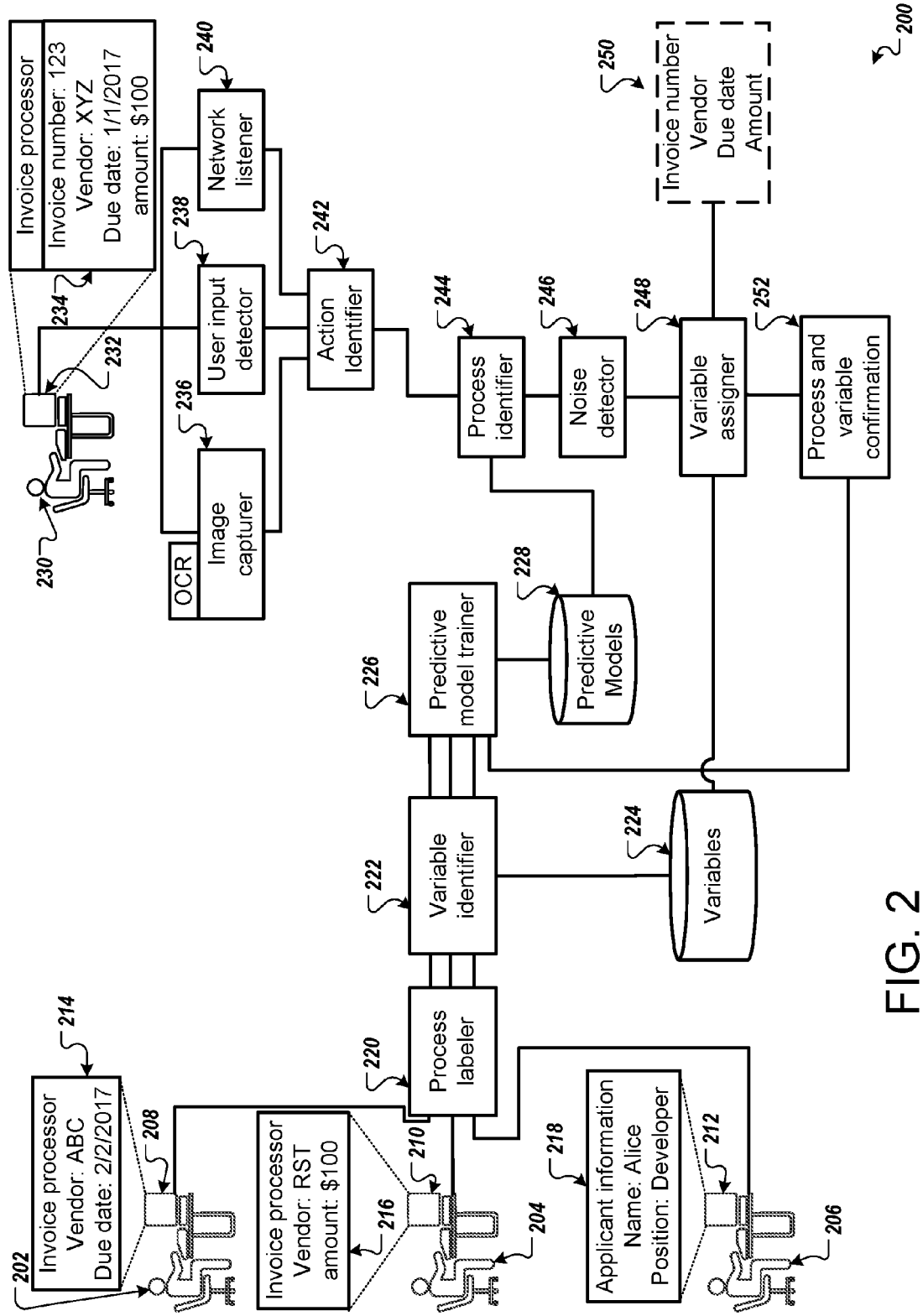

FIG. 2 illustrates an example system 200 for a cognitive robotic analyzer. Briefly, and as described in more detail below, the system 200 receives training data based on users' previous interactions with computing devices. The training data identifies the process that a user's interactions perform as well as actions that represent variable data. The system 200 generates a predictive model to assign processes to other users' interactions with computing devices and identify variables in groups of interactions that preform the same process. The system 200 may also identify noise or actions that are not related to the overall process.

In the example shown in FIG. 2, the system 200 receives training data that originates from users 202, 204, and 206. User 202 interacts with computing device 208 and uses the invoice processing software to enter an invoice received from ABC vendor that is due Feb. 2, 2017. User 204 interacts with computing device 210 and uses the invoice processing software to enter an invoice received from RST vendor that is for one hundred dollars. User 206 interacts with computing device 212 and uses the human resources software to enter data for an applicant named Alice for the developer position. Each of the computing devices 208, 210, and 212 may be devices that are configured to communicate over a network such as mobile phones, tablets, laptop computers, desktop computers, watches, or any other device that is configured to receive input through a touch screen, keyboard, microphone, pointing device, antenna, camera, or similar device. Each of the computing devices 208, 210, and 212 is also configured to output data to a screen, speakers, or tactile feedback device.

Similar to system 100 of FIG. 1, the system 200 is configured to generate training data by monitoring and collecting input and output data. The system 200 may collect screen capture data, perform image recognition, optical character recognition, monitor network traffic, detect keyboard presses, mouse location and clicks, touch data, audio data received through a microphone, or visual data received through a camera. The system 200 may collect this data at predetermined intervals or in response to receiving data such as a mouse click.

The system 200 may collect process data that relates to the computing processes and software executed by the computing devices and used by each user. The system 200 may also collect data related to the user, the user's employment, the user's location, or other similar type of data. The data may describe the user's seniority in the company. This data may be provided by the user or the system 200 may retrieve the data from a human resources data store that is maintained by the company.

The system 200 provides the data 214, 216, and 218 to the process labeler 220. Similar to process labeler 120, the process labeler 220 labels the actions performed by the users 202, 204, and 206 as performing one or more processes. The process labeler 220 labels the data 214 and 216 each as performing the process of entering an invoice. The process labeler 220 labels the data 218 as performing the process of entering a resume into a human resources data store.

The system 200 provides the data 214, 216, and 218 and the process labels to the variable identifier 222. The variable identifier 222 identifies variables in the actions of similar processes. For example, the variable identifier 122 may identify variables between the data 214 and 216. The data 214 contains the text ABC and the date Feb. 2, 2017. The data 216 contains the text RST and the number one hundred. Because these two processes share the same label, that is entering an invoice. In some implementations, the variable identifier 222 may identify, and possibly store, data related to each variable. For example, the variable identifier 220 may identify ABC and RST as vendor names, Feb. 2, 2017 as a due date, and one hundred as an invoice amount. The variable identifier 220 may store data such as vendor, due date, and amount in the variable data store 224. Similarly, for data 218, the variable identifier 222 may identify variable Alice and developer. As with the characteristic labeler 122, the variable identifier 222 may be implemented by one or more individuals who review the data 214, 216, and 218 and identifier the portions of the data that likely change with each execution of each process.

The system 200 provides the data that has labeled with different process labels and variable identifiers to the predictive model trainer 226. Similar to the predictive model trainer 126, the predictive model trainer 226 generates predictive models that are designed to apply labels to actions that a user performs with a computing device. The predictive model trainer 226 generates and stores the predictive models in the predictive model data store 228. The predictive model trainer 226 generates the predictive models using neural networks. In an example, the predictive model trainer 226 may generate a model that a user as performing the process of entering a vendor invoice if the user accesses an invoice processing program and enters data that appears to identify a vendor, a due date, and an amount. However, the predictive model trainer 226 may also train the model to take into consideration other factors such as word spellings, other software used, web sites visited, etc. One factor may not be enough to assign a label. In some implementations, the predictive model trainer 226 may generate a model for each process. For example, there may be a model to identify the entering an invoice, entering a resume, sending an email, entering a calendar appointment, etc.

With the predictive models stored in the predictive model data store 228, the system 200 is ready to identify actions, processes, and variables. In the example shown in FIG. 2, the user 230 interacts with computing device 232. The user 230 accesses the invoice processing software and enters the invoice number of 123, the vendor XYZ, the due date of Jan. 1, 2017, and the amount due of one hundred dollars. The computing device 232 communicates, over a network, with different components of the system 200 that are configured to detect different actions performed by the user 230. The components include an image capturer 236 that is configured to capture images of the screen of the computing device 232. The components also include a user input detector 238 that is configured to detect different types of user input. The components also include a network listener 240 that is configured to monitor network data received and transmitted from the computing device 232. In some implementations, the components include a device that is configured to query the computing device 232 to retrieve the processes being executed by the computing device 232 including the process that is running in the foreground. The image capturer 236, user input detector 238, and network listener 240 have similar characteristics to the corresponding components of FIG. 1.

The image capturer 236 is configured to capture the data shown in the display of the device 232 at periodic intervals. For example, the image capturer 236 may capture a screen shots every five seconds. The image capturer 236 may also capture the screen as directed by the user input detector 238. For example, the image capturer 236 may capture the screen when the user clicks the mouse or touches the screen. In addition to capturing screen shots, the image capturer 236 also performs optical character recognition on the screen shots. The image capturer 236 may identify the text 123, XYZ, $100, and 1/1/2017. The image capturer 236 may also perform image recognition. For example, the image capturer 236 may be able to the logo of the invoice processing software.

The user input detector 238 is configured to detect user input and output through various types of user input devices such as a mouse click, keyboard press, screen touch, print job, camera capture, microphone input, speaker output, etc. In the example shown in FIG. 2, the user input detector 238 detects that the user typed the keys 1-2-3-tab-XYZ-tab-100 in addition to other key presses. The user input detector 238 may also detect that the user typed "123" when the cursor was located at pixel 679×541.

The network listener 240 is configured to detect network data packet traffic that is transmitted and received by the computing device 232. The network listener 240 may receive data packets related to a request for data from an internal company server. The internal server may return data packets to the computing device 232. A process detector that is configured to receive data that is related to the processes running on the computing device 232 may receive data indicating that invoice processing software is running in the foreground. The process detector may receive data indicating that other processes are running in the background such as an email program and a web browser. The process detector may receive data at the point when the user switches the web browser program to the foreground and then returns the invoice processing software to the foreground.

The system 200 provides the data related to activity 234 performed by the user 230 on computing device 232 to the action identifier 242. Similar to action identifier 142, the action identifier 242 is configured to identify actions performed by the user 230 based on the data received from the image capturer 236, the user input detector 238, the network listener 240, and possibly the process detector. The action identifier 242 compares the data received from the components and the timing data of each piece of data to determine the actions performed. For example, the action identifier 242 receives data indicating that the user typed "123" when the cursor was located at pixel 679×541 at a particular time. The action identifier 242 examines the screen capture data to determine that that pixel is located near the text of "invoice number." The action identifier may also examine the network data to determine that the network traffic indicates that the computing device 232 sent a data packet that included the text "123" to an internal company server. Based on this data, the action identifier 142 may determine that the user 230 selected a field labeled "invoice number" and then entered the text "123."

The action identifier 242 may be configurable to detect actions at varying levels of granularity. For example, the action identifier 242 may be configured not identify each letter keystroke as an action. Instead the action identifier 242 may identify when the user enters groups of letters separated by spaces, punctuation keys, or another input besides the keyboard. Alternatively, the action identifier 242 may also be configured to identify each keystroke as an action such that 1-2-3 would be three identified actions.

The action identifier 242 provides data identifying consecutive actions performed by the user 230 to the process identifier 244, which has similar functionality to the process identifier 144. The actions identified by the action identifier 242 may include clicking the mouse near the text "invoice number, typing "123," selecting the tab key to move the cursor near the text "vendor," typing "XYZ." The process identifier 244 is configured to access the predictive models 228 to identify the processes that the user 230 is performing with the actions identified by the action identifier 242. The process identifier 244 selects the most likely process that corresponds to the actions. The process identifier 244 may generate a likelihood score that indicates the chance of a particular process corresponding to the actions. The process identifier 144 may calculate a score of 0.76 of the user entering an invoice. The other scores may be 0.54 for the user composing an email and 0.39 for the user entering data into a spreadsheet. In this case, the process identifier 244 determines that the user 230 is likely entering an invoice.

The system 200 provides data identifying consecutive actions performed by the user 230 and the likely process to the noise detector 246. The noise detector 246 access previous groups of actions that are labeled as performing the same process. In the example shown in FIG. 2, the noise detector 246 retrieves groups of actions that perform the process of entering an invoice. The noise detector 246 identifies similar actions among the processes and identifies some actions as noise. The noise actions may be ones that are not related to the core process, but rather represent additional input or activity by the user. For example, the noise detector 246 compares the actions of user 230 to other groups of actions entering an invoice. The noise detector 246 may identify some actions such as typing "socialmedia.com," "shopping.com," or "lunch" as actions that are not part of the core process of entering an invoice because those actions, when removed from the corresponding group of actions, do not affect the process. The noise detector 246 may test whether an action corresponds to noise by removing the action and providing the updated group of actions to the process identifier 244. Based on the score returned by the process identifier, the noise detector 246 may determine whether the action was noise. For example, if the score decreases by a particular amount, then it may be less likely that the action is noise. If the score does not change, then it is more likely that the action is noise.

The system 200 provides the data identifying consecutive actions performed by the user 230, data identifying the noise actions, and the likely process to the variable assigner 248. The variable assigner 248 is configured to assign a variable label to the actions which include information that is part of the core process but which typically varies for each of the groups of actions that perform the process. A variable different than noise in that if a variable is removed from a group of actions, then the process score may change such that the group of actions is less likely to correspond to the same process. For example, if the actions performed by user 230 do not include typing "123," or typing "XYZ," then the process identifier 244 may determine that the actions are less likely to correspond to the process of entering an invoice based on the calculated scores. Therefore, the variable assigner 248 may labels the actions of typing "123" and typing "XYZ" as variables.

In some implementations, the variable assigner 248 accesses a variable data store 224 that includes previously identified names of variables. The variable assigner 248 may assign a variable name to each of the identified variables. The variable assigner 248 may assign variable names based on the actions that are performed recently before or soon after the user enters the variable. For example, the action typing "123" is preceded by the action of moving the cursor near the text "invoice number." The variable assigner 248 may use this information to name that variable "invoice number" based on "invoice number" being a variable named in the variable data store 224. In the example shown in FIG. 2, the variable assigner 248 names variables 250 as invoice number, vendor, due date, and amount.

The system 200 may include process and variable confirmation 252 that is configured to solicit feedback from the user 230 or other individuals to confirm or reject the labels assigned by the process identifier 244, the noise detector 246, and the variable assigner 248. Similar to the characteristic confirmation 150, the system 200 may provide the feedback to the predictive model trainer 226 to tune and update the predictive models 228.

The system 200 may be used to generate and improve automation of processes. For example, the system 200 may identify a fast way of performing a process by examining users performing the process as well as identify the essential actions of the process. Referring to FIG. 2, the system 200 may identify a low number of actions to perform the process of entering an invoice. Similarly, the system 200 may identify actions that lengthen the process of entering an invoice. The system can then provide guidance to users who perform the unnecessary actions.

In some implementations, the systems 100 and 200 may be used for process mining techniques. The process mining techniques may be applied to the identified actions and identified processes to identify trends, patterns, and details contained in the actions. Similar to some of the components describes above, the processing mining techniques may employ machine learning to tune and adjust the functions that identify the trends, patterns, and details.

Figure 3:
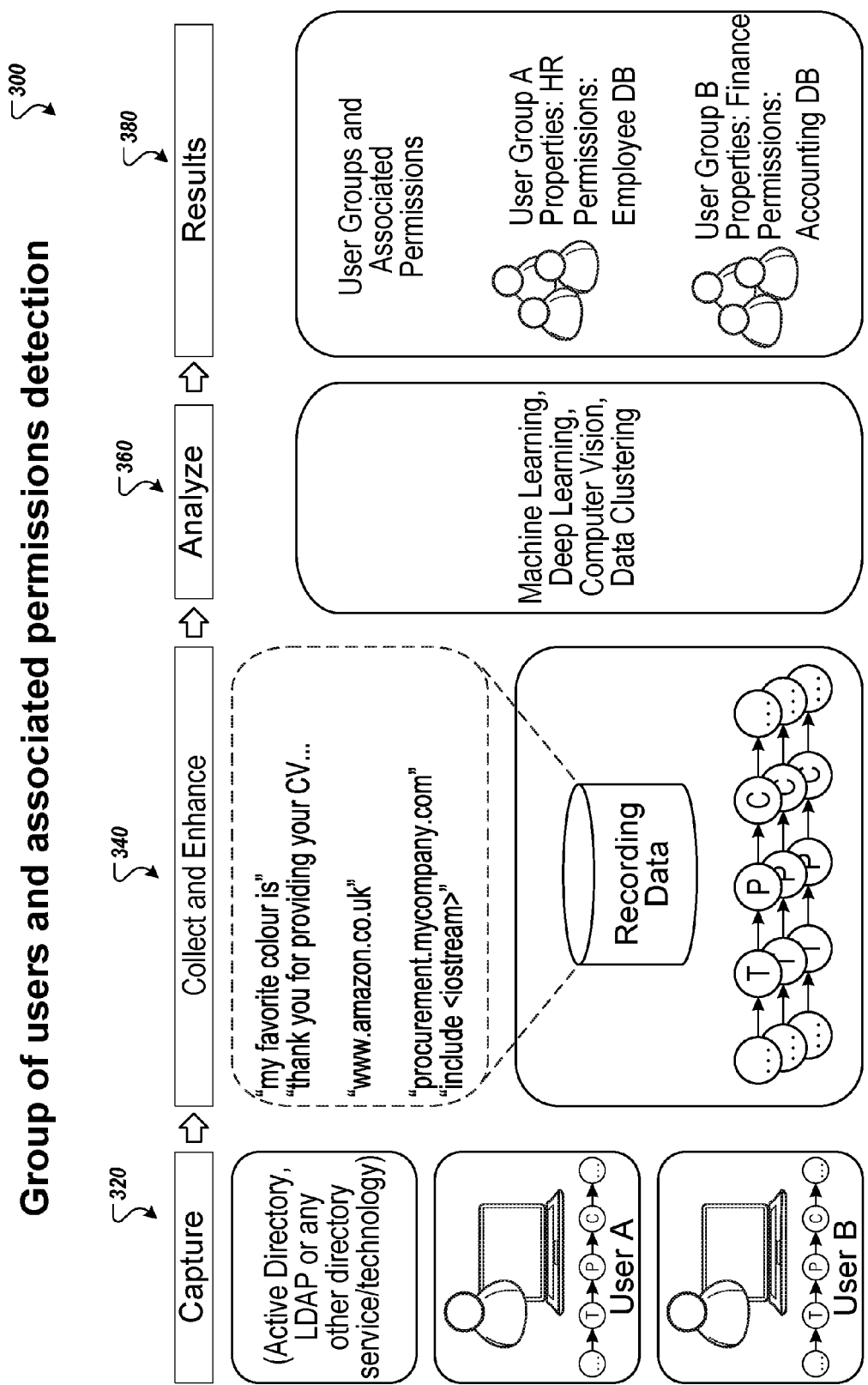

FIG. 3 illustrates an example system 300 for a cognitive robotic analyzer. The system 300 may be grouped into four stages, the capture stage 320, the collect and enhance stage 340, the analyze stage 360, and the results stage 380. The system 300 is configured to group users according to similar characteristics and then assign common permissions to users with the same characteristics.

The capture stage 320 collects data related to actions that the user performs on a computing device. The actions may be related to mouse clicks, keyboard typing, touch screen swipes, software used, etc. The system 300 provides the captured action data to the collect and enhance stage 340. The collect and enhance stage 340 distills the raw input and output actions into higher level actions such as opening a browser, entering a web address, opening an email, opening an attachment, etc.

The analyze stage 360 receives the action data from the collect and enhance stage 340 and applies a predictive model to identify the process being performed by the actions. The predictive model may utilize neural networks, machine learning, deep learning, contextual intelligence, and data clustering to identify the processes performed by the actions. Some example processes may include visiting a website or receiving and viewing an attachment. The analyze stage 360 also determines various characteristics of each users based on the actions the user takes in completing a process. For example, a user who visits web pages that end in co.uk or uses the spelling "colour" may be located in the United Kingdom. A user who receives an email with attachments named resume, cover letter, or CV may be employed in the human resources department. A user performs may processes that involve using a software development tool may be a developer.

The results stage 380 receives the user characteristics from the analyze stage 360 and groups the users according to characteristics. The results stage 360 may grant certain permissions to users who share a characteristic and deny permissions to other users who share other characteristics. The system can base the permissions on the actual actions performed by the users instead of on the action that the users are supposed to be performing.

Figure 4:
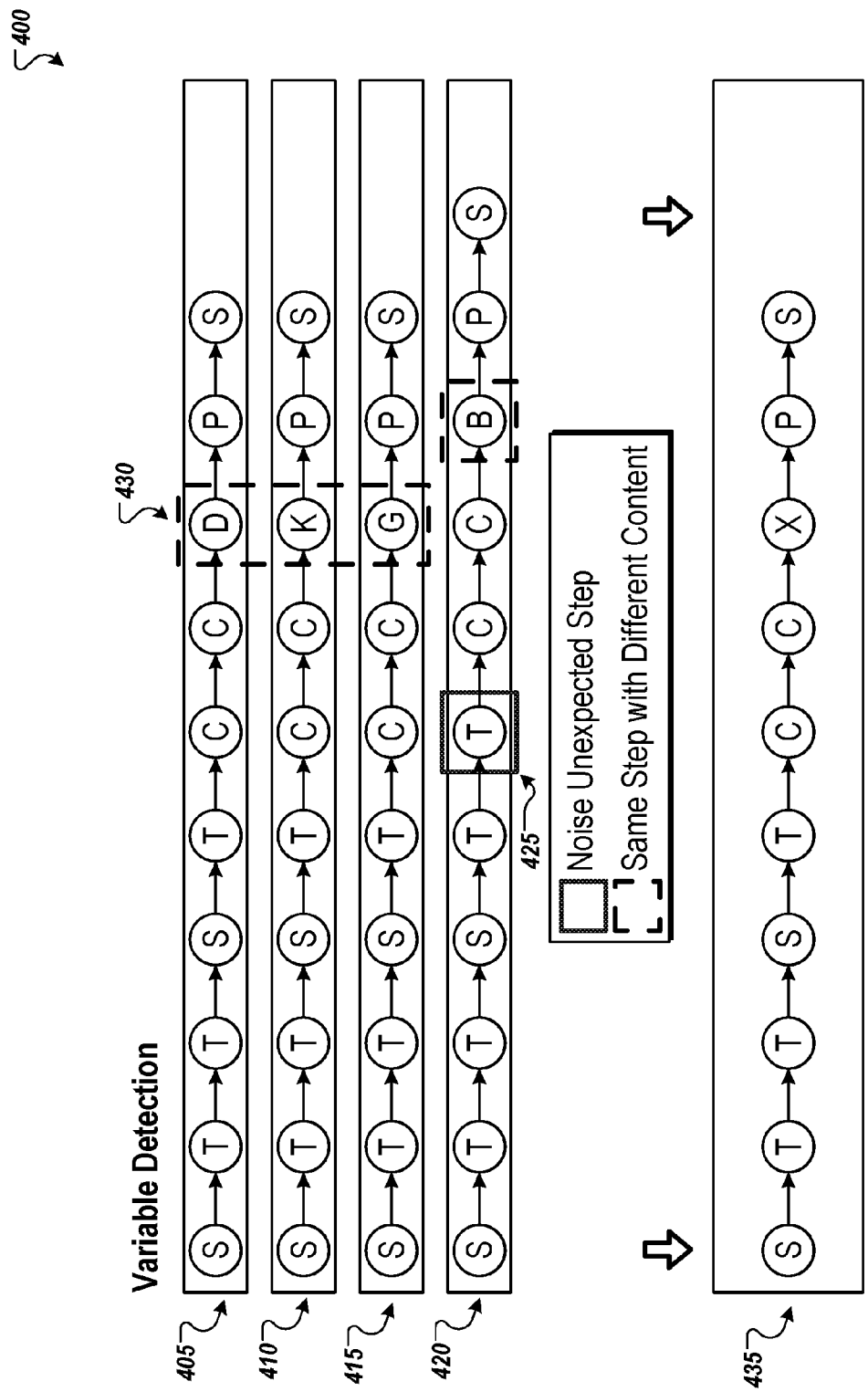
FIG. 4 illustrates an example group of actions performing a similar process.

FIG. 4 illustrates an example group of actions 400 performing a similar process. Each group of actions may be identified as performing the same process by system 200. For example, the groups of actions 405, 410, 415, and 420 may each perform the process of entering an invoice.

Each of the actions of each group is illustrated by a circle and a corresponding letter. The actions may include actions similar to those discussed above, such as clicking the mouse, typing a series of letters, opening software, switching application, etc. Similar actions are illustrated by similar letters. For example, the T actions all perform the same or similar actions. When the system compares the actions of groups 405, 410, 415, and 420. The system identifies action 425 as noise because the action 425 is inserted into the group 420 while the actions before and after the action 425 correspond to the actions of the other groups 405, 410, and 415.

The system may also identify the actions that correspond to a variable. In analyzing the groups 405, 410, 415, and 420, the system identifies actions 430 that each include different information. Because each of the actions before and after the actions 430 correspond to the same actions and because each group 405, 410, 415, and 420 corresponds to the same process, the system identifies the actions 430 as a variable. Group 435 illustrates the compete process with the noise 425 removed and the variable replaced by an "X."

Figure 5:
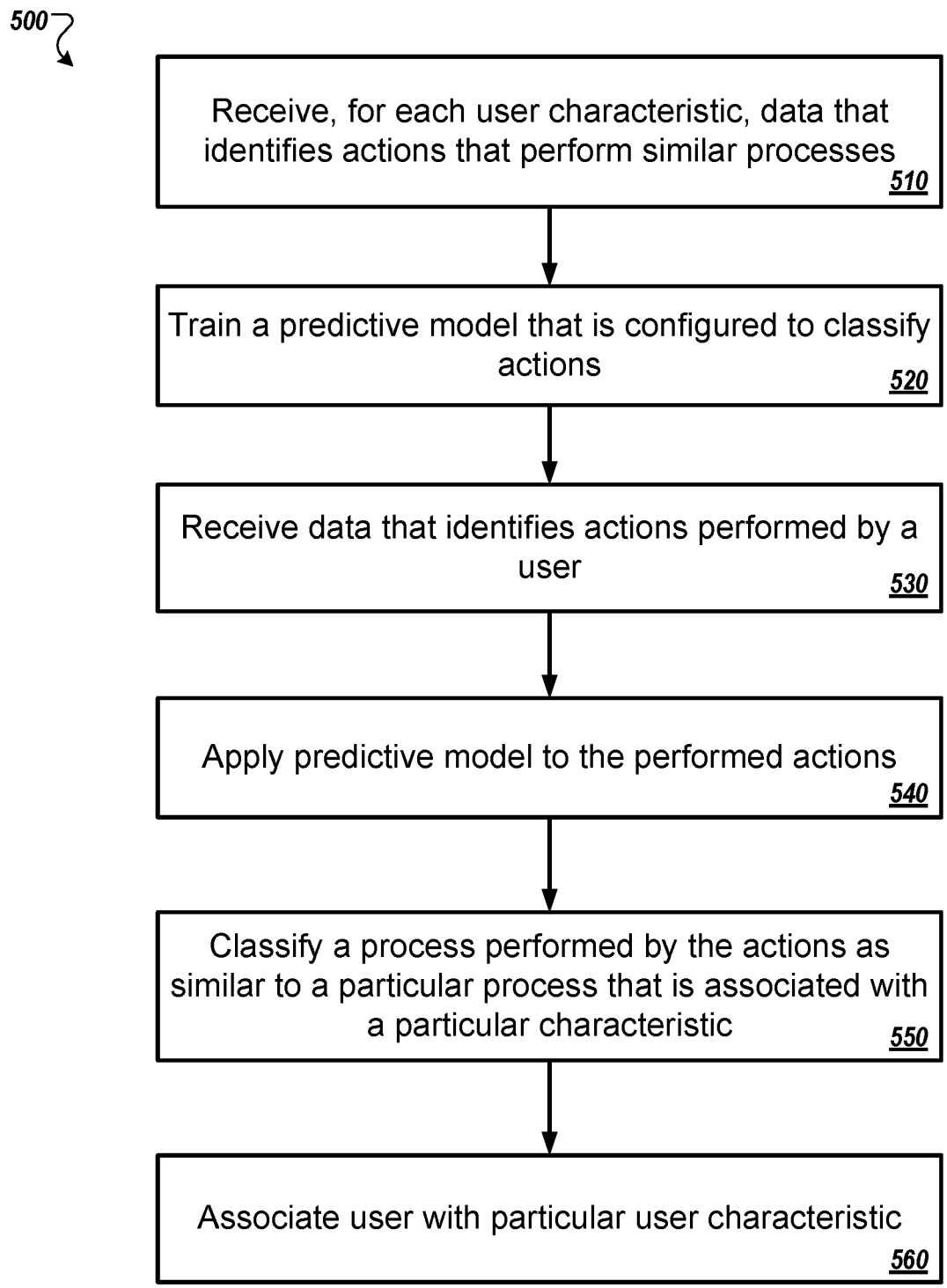
FIGS. 5 and 6 illustrate example processes for cognitive robotic analyzers.

FIG. 5 illustrates an example process 500 for a cognitive robotic analyzer. In general, the process 500 trains a predictive model to classify users as having a particular characteristic based on the processes or actions each user performs. The process 500 will be described as being performed by a computer system comprising one or more computers, for example, the system 100 as shown in FIG. 1.

The system receives, for each user characteristic of a plurality of user characteristics, first data that identifies one or more first actions that perform a first process and second data that identifies one or more second actions that perform a second process that is labeled as similar to the first process (510). In some implementations, the system performs computer vision techniques on screen captured data received for each process. The computer vision techniques may perform optical character recognition and image recognition. In some implementations, the system receives user input data for each process. The user input data may include keyboard entries, mouse clicks, camera capture data, microphone capture data, audio output to speakers, data sent to the printer, data received and transmitted wirelessly, etc. In some implementations, the system receives network traffic data based on the wired or wireless network packets sent and received by the devices.

The system trains, using the first data for each user characteristic and using the second data for each user characteristic, a predictive model that is configured to classify actions as similar or not similar to the first process and the second process (520). In some implementations, a processes are similar if the processes use the same software or hardware. In some implementations, the processes are similar if they correspond to the same end result such as entering an invoice, sending an email, receiving an email, or entering a search query. In some implementations, the predictive model uses neural networks, machine learning, deep learning, and data clustering to generate the model.

The system receives data that identifies actions performed by a user (530). In some implementations, the actions include a key press, a mouse click, a screen touch, a foreground process change, a scene change, a network request, or a network receipt. The system applies the predictive model to one or more of the actions (540). The system, based on applying the predictive model to the one or more of the actions, classifies a process performed by the one or more actions as similar to a particular process that is associated with a particular user characteristic (550). In some implementations, the process is a group of actions for viewing a website, receiving a type of email attachment, entering a type of data, performing a web search, or using a type of software.

The system associates the user with the particular user characteristic (560). In some implementations, a user characteristic identifies a company, a geographic location, an operational unit, an operational role, or an expertise level. In some implementations, the system provides a user the option of confirming or rejecting the assigned characteristic. For example, the user may confirm that the user is locate in the United Kingdom. The system may then use this data to tune or retrain the predictive model. Similarly, if the user rejects the characteristic that the user is located in the United Kingdom, then the system will also use that data to tune or retrain the predictive model.

Figure 6:
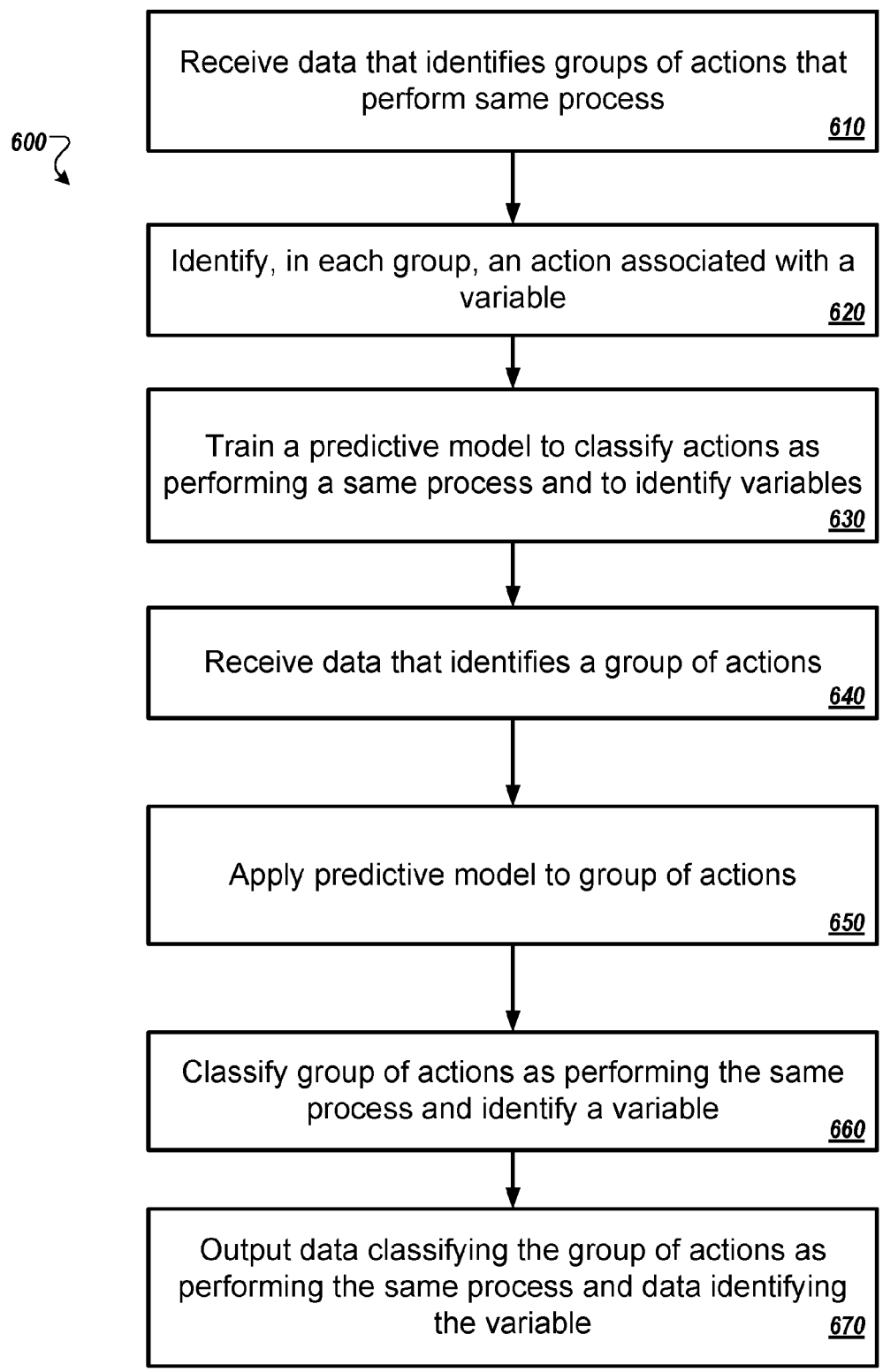

FIG. 6 illustrates an example process for a cognitive robotic analyzer. In general, the process 600 trains a predictive model to identify variables in a group of actions that perform a process. The process 600 will be described as being performed by a computer system comprising one or more computers, for example, the system 200 as shown in FIG. 2.

The system receives data that identifies groups of one or more actions that are labeled as performing a same process (610). The system identifies, in each group of one or more actions, a particular action that is associated with variable information (620). In some implementations, the system performs computer vision techniques on the received data such as optical character recognition and image recognition. In some implementations, the system identifies actions by analyzing user input such as may include keyboard entries, mouse clicks, camera capture data, microphone capture data, audio output to speakers, data sent to the printer, data received and transmitted wirelessly, etc. In some implementations, the system receives network traffic data based on the wired or wireless network packets sent and received by the devices.

The system trains, using the data that identifies the groups of the one or more actions that are labeled as performing the same process and using the particular actions that are associated with variable information, a predictive model that is configured to (i) classify a group of one or more actions as performing the same process or not performing the same process and (ii) identify an action of the group of the one or more actions that is associated with variable information (630). In some implementations, the predictive model uses neural networks, machine learning, deep learning, and data clustering to generate the model.

The system receives data that identifies a given group of actions (640). In some implementations, an action is a key press, a mouse click, a screen touch, a foreground process change, a scene change, a network request, or a network receipt. The system applies the predictive model to the given group of actions (650). In some implementations, the system, based on applying the predictive model to the given group of actions, identifies an additional action of the given group of actions that is associated with noise action. For example, a noise action may be an action that is before and after actions that typically correspond to a particular process, such as typing shopping when entering an invoice into a spreadsheet. The system, based on applying the predictive model to the given group of actions, classifies the given group of actions as performing the same process and identifying a given action of the given group of actions that is associated with variable information (660).

The system outputs data classifying the given group of actions as performing the same process and data identifying the given action and the variable information (670). In some implementations, the system provides the user with the option of confirming or rejecting the groups of actions as performing the same process and whether the variable information is actually variable. The system may use the user's response to train or tune the predictive model. In some implementations, the system assigns a name to the variable information. The name may be related to an action near the variable such as "invoice number" or "vendor." In some implementations, the system determines a type of variable that corresponds to the variable information. The type may include an integer, a string, a long number, a double number, a character, or any other computer variable type.

Figure 7:
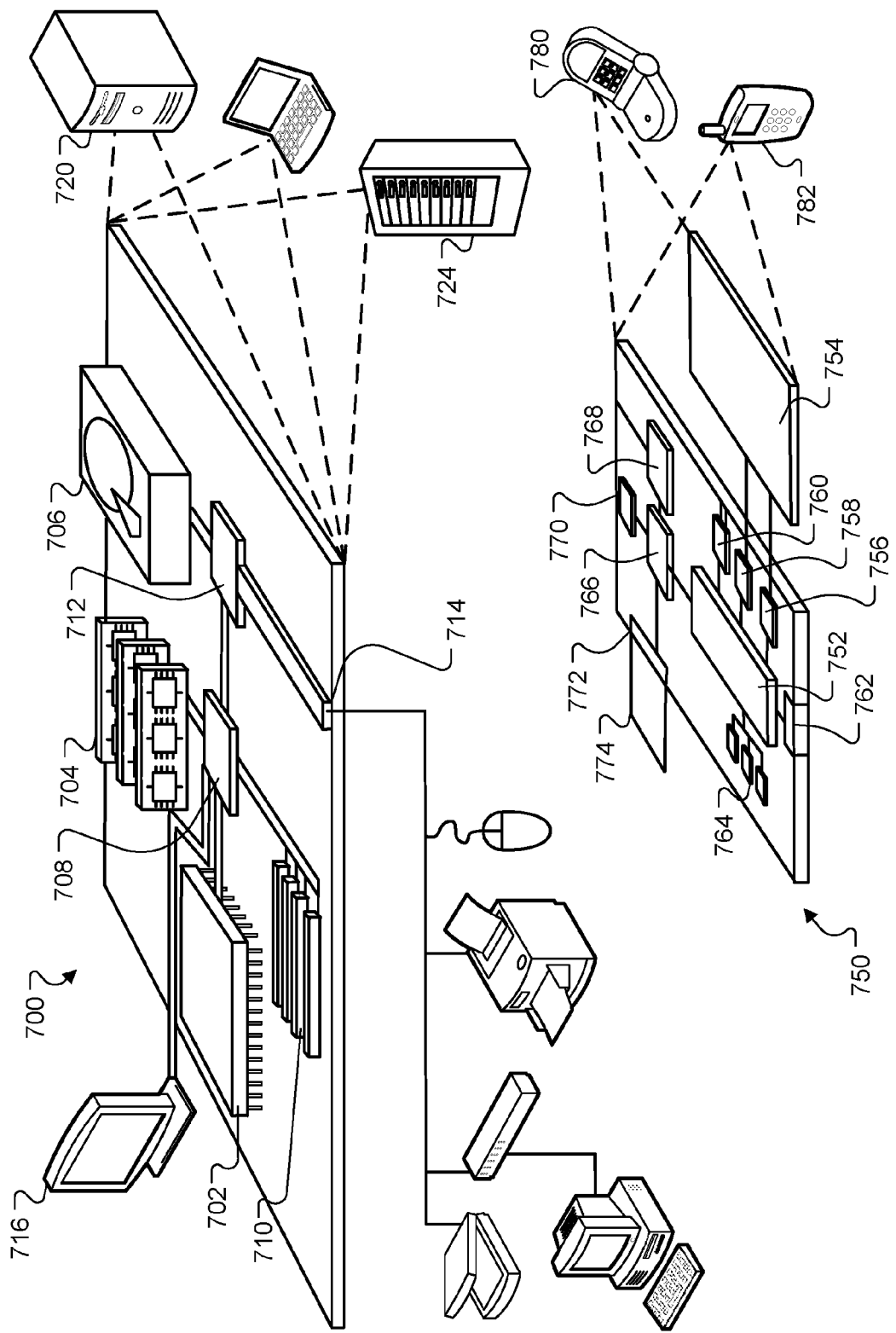
FIG. 7 illustrates an example of a computing device and a mobile computing device.

FIG. 7 shows an example of a computing device 700 and a mobile computing device 750 that can be used to implement the techniques described here. The computing device 700 is intended to represent various forms of digital computers, such as laptops, desktops, workstations, personal digital assistants, servers, blade servers, mainframes, and other appropriate computers. The mobile computing device 750 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 702), perform one or more methods, such as those described above. The instructions can also be stored by one or more storage devices such as computer- or machine-readable mediums (for example, the memory 704, the storage device 706, or memory on the processor 702).

The high-speed interface 708 manages bandwidth-intensive operations for the computing device 700, while the low-speed interface 712 manages lower bandwidth-intensive operations. Such allocation of functions is an example only. In some implementations, the high-speed interface 708 is coupled to the memory 704, the display 716 (e.g., through a graphics processor or accelerator), and to the high-speed expansion ports 710, which may accept various expansion cards. In the implementation, the low-speed interface 712 is coupled to the storage device 706 and the low-speed expansion port 714. The low-speed expansion port 714, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device, such as a mobile computing device 750. Each of such devices may contain one or more of the computing device 700 and the mobile computing device 750, and an entire system may be made up of multiple computing devices communicating with each other.

The mobile computing device 750 includes a processor 752, a memory 764, an input/output device such as a display 754, a communication interface 766, and a transceiver 768, among other components. The mobile computing device 750 may also be provided with a storage device, such as a micro-drive or other device, to provide additional storage. Each of the processor 752, the memory 764, the display 754, the communication interface 766, and the transceiver 768, are interconnected using various buses, and several of the components may be mounted on a common motherboard or in other manners as appropriate.

The processor 752 can execute instructions within the mobile computing device 750, including instructions stored in the memory 764. The processor 752 may be implemented as a chipset of chips that include separate and multiple analog and digital processors. The processor 752 may provide, for example, for coordination of the other components of the mobile computing device 750, such as control of user interfaces, applications run by the mobile computing device 750, and wireless communication by the mobile computing device 750.

The processor 752 may communicate with a user through a control interface 758 and a display interface 756 coupled to the display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may provide communication with the processor 752, so as to enable near area communication of the mobile computing device 750 with other devices. The external interface 762 may provide, for example, for wired communication in some implementations, or for wireless communication in other implementations, and multiple interfaces may also be used.

The memory 764 stores information within the mobile computing device 750. The memory 764 can be implemented as one or more of a computer-readable medium or media, a volatile memory unit or units, or a non-volatile memory unit or units. An expansion memory 774 may also be provided and connected to the mobile computing device 750 through an expansion interface 772, which may include, for example, a SIMM (Single In Line Memory Module) card interface. The expansion memory 774 may provide extra storage space for the mobile computing device 750, or may also store applications or other information for the mobile computing device 750. Specifically, the expansion memory 774 may include instructions to carry out or supplement the processes described above, and may include secure information also. Thus, for example, the expansion memory 774 may be provide as a security module for the mobile computing device 750, and may be programmed with instructions that permit secure use of the mobile computing device 750. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 752), perform one or more methods, such as those described above. The instructions can also be stored by one or more storage devices, such as one or more computer- or machine-readable mediums (for example, the memory 764, the expansion memory 774, or memory on the processor 752). In some implementations, the instructions can be received in a propagated signal, for example, over the transceiver 768 or the external interface 762.

The mobile computing device 750 may communicate wirelessly through the communication interface 766, which may include digital signal processing circuitry where necessary. The communication interface 766 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 768 using a radio-frequency. In addition, short-range communication may occur, such as using a Bluetooth, WiFi, or other such transceiver. In addition, a GPS (Global Positioning System) receiver module 770 may provide additional navigation- and location-related wireless data to the mobile computing device 750, which may be used as appropriate by applications running on the mobile computing device 750.

The mobile computing device 750 may also communicate audibly using an audio codec 760, which may receive spoken information from a user and convert it to usable digital information. The audio codec 760 may likewise generate audible sound for a user, such as through a speaker, e.g., in a handset of the mobile computing device 750. Such sound may include sound from voice telephone calls, may include recorded sound (e.g., voice messages, music files, etc.) and may also include sound generated by applications operating on the mobile computing device 750.

The mobile computing device 750 may be implemented in a number of different forms, as shown in the figure. For example, it may be implemented as a cellular telephone 780. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
   receiving first action data that identifies one or more first actions that were initiated by a first user and second action data that identifies one or more second actions that were initiated by a second user;
   receiving first process data that identifies a first process performed by the one or more first actions and second process data that identifies a second process performed by the one or more second actions;
   receiving process similarity data that indicates that the first process is similar to the second process;
   receiving user characteristic data that identifies a common demographic, geographic, or employment attribute of the first user and the second user;
   training, using the first action data, the second action data, additional action data, the first process data, the second process data, additional process data, the process similarity data, additional process similarity data, the user characteristic data, and additional user characteristic data, a predictive model that is configured to classify actions as performing a process that is similar or not similar to the first process and the second process;
   receiving data that identifies actions performed by a particular user;
   applying the predictive model to one or more of the actions initiated by the particular user;
   based on applying the predictive model to the one or more of the actions initiated by the particular user, classifying a process performed by the one or more of the actions as similar to the first process and the second process; and
   based on classifying the process initiated by the one or more of the actions as similar to the first process and the second process, assigning the common demographic, geographic, or employment attribute to the particular user.

2. The method of claim 1, comprising:
   receiving data confirming that the particular user possesses the common demographic, geographic, or employment attribute; and
   updating the predictive model based on the data confirming that the particular user possesses the common demographic, geographic, or employment attribute.

3. The method of claim 1, comprising:
   receiving data confirming that the particular user does not possess the common demographic, geographic, or employment attribute; and
   updating the predictive model based on the data confirming that the particular user does not possess the common demographic, geographic, or employment attribute.

4. The method of claim 1, wherein receiving first action data that identifies one or more first actions that were initiated by a first user and second action data that identifies one or more second actions that were initiated by a second user comprises:
   receiving first screen capture data from a device performing the one or more first actions;
   receiving second screen capture data from a device performing the one or more second actions;
   generating the first action data by performing computer vision techniques on the first screen capture data; and
   generating the second action data by performing computer vision techniques on the second screen capture data.

5. The method of claim 1, wherein receiving first action data that identifies one or more first actions that were initiated by a first user and second action data that identifies one or more second actions that were initiated by a second user comprises:
   receiving first user input data from a device performing the one or more first actions;
   receiving second user input data from a device performing the one or more second actions;
   generating the first action data by analyzing the first user input data; and
   generating the second action data by analyzing the second user input data.

6. The method of claim 1, wherein receiving first process first action data that identifies one or more first actions that were initiated by a first user and second action data that identifies one or more second actions that were initiated by a second user comprises:
   receiving first network traffic data from a device performing the one or more first actions;
   receiving second network traffic data from a device performing the one or more second actions;
   generating the first action data by analyzing the first network traffic data; and
   generating the second action data by analyzing the second network traffic data.

7. The method of claim 1, wherein the first process is similar to the second process based on the first process and the second process using a same hardware or a same software.

8. The method of claim 1, wherein the common demographic, geographic, or employment attribute identifies a company, a geographic location, an operational unit, an operational role, or an expertise level.

9. The method of claim 1, wherein an action of the one or more first actions, the one or more second actions, or the actions comprises a key press, a mouse click, a screen touch, a foreground process change, a scene change, a network request, or a network receipt.

10. The method of claim 1, wherein the process, the first process, or the second process comprises viewing a website, receiving a type of email attachment, entering a type of data, performing a web search, or using a type of software.

11. A computer-implemented method comprising:
receiving first action data that identifies one or more first actions and second action data that identifies one or more second actions;
receiving first process data that identifies a first process performed by the one or more first actions and second process data that identifies a second process performed by the one or more second actions;
receiving process similarity data that indicates that the first process is similar to the second process;
receiving first variable action data that identifies a first given action of the one or more first actions that processes first variable information and second variable action data that identifies a second given action of the one or more second actions that processes second variable information;
training, using the first action data, the second action data, additional action data, the first process data, the second process data, additional process data, the process similarity data, additional process similarity data, the first variable action data, the second variable action data, and additional variable action data, a predictive model that is configured to (i) classify one or more actions as performing a process that is similar or not similar to the first process and the second process and (ii) identify a given action among the one or more actions that processes variable information;
receiving data that identifies actions;
applying the predictive model to one or more of the actions;
based on applying the predictive model to the one or more of the actions, (i) classifying a process performed by the one or more of the actions as similar to the first process and the second process and (ii) identifying a given action of the one or more of the actions that processes variable information; and
based on classifying the process as performed by the one or more of the actions as similar to the first process and the second process and on identifying the given action of the one or more of the actions that processes variable information, providing, for output, (i) data identifying the one or more of the actions as similar to the first process and the second process and (ii) data identifying the given action as processing variable information.

12. The method of claim 11, comprising:
receiving data confirming that the process is similar to the first process and the second process; and
updating the predictive model based on the data confirming that the process is similar to the first process and the second process.

13. The method of claim 11, comprising:
receiving data confirming that the process is not similar to the first process and the second process; and
updating the predictive model based on the data confirming that the process is not similar to the first process and the second process.

14. The method of claim 11, wherein receiving first action data that identifies one or more first actions and second action data that identifies one or more second actions comprises:
receiving first screen capture data from a first device performing the one or more first actions;
receiving second screen capture data from a second device performing the one or more second actions;
generating the first action data by performing computer vision techniques on the first screen capture data; and
generating the second action data by performing computer vision techniques on the second screen capture data.

15. The method of claim 11, wherein receiving first action data that identifies one or more first actions and second action data that identifies one or more second actions comprises:
receiving first user input data from a first device performing the one or more first actions;
receiving second user input data from a second device performing the one or more second actions;
generating the first action data by analyzing the first user input data; and
generating the second action data by analyzing the second user input data.

16. The method of claim 11, wherein receiving first action data that identifies one or more first actions and second action data that identifies one or more second actions comprises:
receiving first network traffic data from a first device performing the one or more first actions;
receiving second network traffic data from a second device performing the one or more second actions;
generating the first action data by analyzing the first network traffic data; and
generating the second action data by analyzing the second network traffic data.

17. The method of claim 11, wherein an action of the one or more first actions, the one or more second actions, or the actions comprises a key press, a mouse click, a screen touch, a foreground process change, a scene change, a network request, or a network receipt.

18. The method of claim 11, comprising:
based on applying the predictive model to the one or more of the actions, identifying an additional action of the one or more of the actions that is a superfluous action for performance of the process performed by the one or more of the actions.

19. The method of claim 11, comprising:
determining a type of variable corresponding to the given action; and
providing, for output, the type of variable corresponding to the given action.

20. The method of claim 11, wherein the data identifying the given action as performing the variable information comprises a name for the variable information based on the given action.

* * * * *